Nov. 22, 1960  P. J. C. KAASENBROOD  2,961,464
UREA CONCENTRATION PROCESS
Filed Dec. 11, 1957
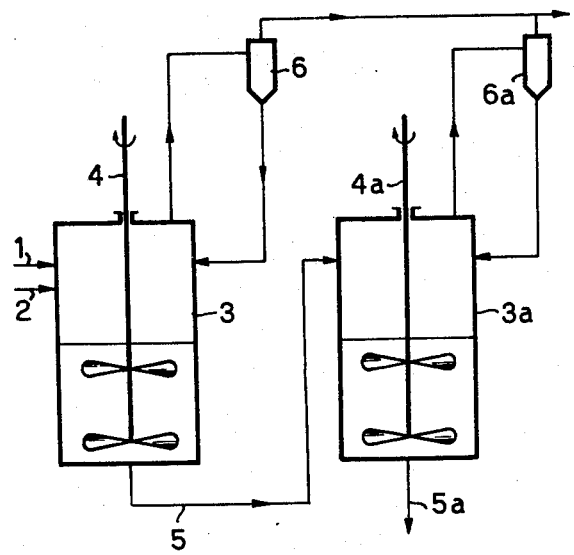
INVENTOR
PETRUS J. C. KAASENBROOD
BY Cushman, Darby & Cushman
ATTORNEYS

United States Patent Office 2,961,464
Patented Nov. 22, 1960

2,961,464

UREA CONCENTRATION PROCESS

Petrus J. C. Kaasenbrood, Sittard, Netherlands, assignor to Stamicarbon N.V., Heerlen, Netherlands Filed Dec. 11, 1957, Ser. No. 702,127

Claims priority, application Netherlands Dec. 15, 1956

6 Claims. (Cl. 260—555)

This invention relates to the preparation of water free and biuret free urea.

United States patent application Serial No. 690,503, filed October 16, 1957, in the names of Hendrik Biekart et al. discloses concentrating aqueous urea solutions to a substantially water free melt by stepwise evaporation in vacuo. In the final evaporation stage advantage is taken of the fact that upon expansion the solution spontaneously separates into water vapor and solid urea. The water vapor formed is discharged from the evaporation chamber and the solid urea is converted to a melt and also discharged from the chamber. The entire disclosure of the Biekart et al. application is hereby incorporated by reference.

It is an object of the present invention to further improve the urea separation procedure of the Biekart et al. application.

An additional object is to devise a simple and rapid procedure for separating water vapor from urea.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the essential rapid separation between the formed water vapor and the urea may be effected in a simple manner by discharging the urea in the form of a suspension in a liquid which is inert to urea, possesses a low vapor tension at the temperatures employed and which does not mix with molten urea, i.e., it is a nonsolvent for urea.

The preferred liquid is mineral oil. Other liquids which can be employed are hydrocarbons such as naphthalene, and olive oil. Additional inert liquids which can be employed are silicon oil, diphenyl, diphenyloxide or a mixture of diphenyl and diphenyloxide. Preferably, the inert liquid is also a nonsolvent for water.

The starting mixture usually contains 75 to 95% urea and 25 to 5% water by weight. A minor amount, less than 1%, of biuret is also usually present as an impurity. The evaporation is carried out at a vacuum at a pressure of less than 200 mm. of mercury and preferably at a pressure less than 100 mm. Pressure as low as 10 mm. can be employed. The temperature is such that the urea solution will separate into solid urea and water vapor, generally below 132° C. and usually 70–130° C. Under these conditions the solution separates into water vapor and solid urea.

The single figure of the drawing illustrates in diagrammatic fashion the method of carrying out the process.

Referring more specifically to the drawing, aqueous urea solution to be evaporated is supplied through pipe 1 and the inert liquid, e.g., mineral oil, through pipe 2 into an evaporation chamber 3. The pressure in the evaporation chamber is maintained below 200 mm. and the temperature at a corresponding value between 70 and 130° C. in order to separate the solution into water vapor and solid urea. A rapidly rotating stirrer 4, e.g. rotating at 1000 r.p.m., effects an intensive mixing of the separated urea and the inert liquid. This mixture is discharged at the base of the evaporation chamber through pipe 5. To insure complete removal of water vapor, the discharge mixture may optionally be passed through a following evaporation chamber 3a where the removal of water vapor originating from the solution entrained in the suspension is continued. Stirrer 4a, rotating at the same speed as stirrer 4, insures thorough mixing of the urea and inert liquid in chamber 3a. The suspension of solid urea in the inert liquid is then discharged from the evaporation chamber through pipe 5a.

The water vapor formed is carried away from the evaporation chambers 3 and 3a through pipes to separators 6 and 6a where any drops of urea or inert liquid that may have been entrained are separated off and returned to the evaporation chamber.

The process of the invention is particularly useful in processing urea solutions obtained in syntheses involving the formation of carbamate and the subsequent conversion to urea in the presence of an inert viscous liquid, e.g., mineral oil, and discharging the solutions in admixture with the viscous liquid from the synthesis apparatus after passing the dissociation vessels into the evaporation chambers. The use of viscous liquids in synthesis forming urea solutions is disclosed, for example, in Chemical Engineering, vol. 62, April 1955, page 230.

The solid urea formed according to the present invention can be converted into granules by heating the suspension of urea in inert liquid in a heat exchanger, e.g., to 133 to 137° C. until the urea melts and two layers form, one consisting of molten urea and the other of the inert liquid. The molten, substantially water free urea layer is separated and sprayed in the usual way to form droplets. These are allowed to cool and solidify by falling through a free space.

By the process of the instant invention, it is possible to remove substantially all the water from the suspension rapidly and at a relatively low temperature. Consequently, hardly any urea decomposes to biuret.

In the examples in the following table, there was employed the apparatus illustrated in the drawings. Paraffin oil was employed as the inert nonsolvent and was used in such amount that the suspension discharged from the second evaporator was a suspension of 30% by weight of urea in 70% by weight of paraffin oil. The aqueous urea solution introduced into the first evaporation had a concentration of 75% urea by weight and contained 0.2% biuret.

| Example | Temperature in the evaporators, °C. | Pressure, mm. Hg | Speed of Stirrers, rev./min. | Residence time, min. 1st evaporator | Residence time, min. 2nd evaporator | Increase biuret content, weight percent | Percent $H_2O$ in solid urea |
|---|---|---|---|---|---|---|---|
| 1 | 110 | 100 | 1,000 | 7 | 5 | 0.07 | 0.6 |
| 2 | 100 | 50 | 1,000 | 7 | 5 | 0.05 | 0.4 |
| 3 | 110 | 50 | 1,000 | 7 | 5 | 0.05 | 0.2 |

The increase in biuret content, therefore, was only 0.05 to 0.07% by weight. During the subsequent melting of the urea suspended in the paraffin oil, e.g., at 135° C. and separation of the resulting urea melt from the oil, the biuret formation does not exceed 0.25% by weight of urea. Thus, in the instant process there is obtained urea granules containing less than 1% of biuret and also less than 1% of moisture.

The urea and paraffin oil suspension of Example 3, for example, can be heated to 135° C. to form separate urea and paraffin oil layers. The molten urea layer is separated and is then divided into molten globules of about 2 mm. diameter by spraying, and then the globules are cooled by freely falling through air to form the solid urea globules or prills.

Example 4

Example 1 was repeated but instead of introducing the urea solution and paraffin oil separately through pipes 1 and 2 into the first evaporator, there was introduced through a single pipe a mixture of a 77% urea solution together with paraffin oil in an amount of 160% of the urea in the urea solution, the mixture being obtained from a urea synthesis process. The temperature in the evaporators was 105° C., the pressure 50 mm., the speed of the stirrers 1000 r.p.m., the residence time in the first evaporator was 7 minutes and in the second evaporator 5 minutes. The increase in biuret was 0.05% and the percent water in the solid urea obtained was 0.3%.

Unless otherwise stated all parts and percentages are by weight.

I claim:

1. A process for removing water from an aqueous urea solution comprising mixing the urea solution with an inert low volatile water immiscible hydrocarbon mineral oil having a low vapor tension at the temperature employed and removing water vapor from said mixture in a chamber maintained at a pressure below 200 mm. Hg and at a temperature of 70 to 130° C., dispersing solid urea as it is formed in said hydrocarbon and discharging the urea and said hydrocarbon mixture from said chamber.

2. A process according to claim 1 wherein the water is removed at a pressure not over about 100 mm.

3. A process according to claim 2 wherein the pressure is about 50–100 mm.

4. A process according to claim 1 wherein the hydrocarbon is paraffin oil.

5. A process according to claim 1 wherein the urea solution and inert liquid are introduced separately into the chamber.

6. A process according to claim 1 wherein the urea solution and inert liquid are introduced into the chamber as a mixture.

References Cited in the file of this patent

UNITED STATES PATENTS

| | | |
|---|---|---|
| 1,761,893 | Meiser | June 3, 1930 |
| 2,498,538 | Frejacques | Feb. 21, 1950 |
| 2,811,553 | Kamlet | Oct. 29, 1957 |

OTHER REFERENCES

Fiat Final Report 889, Dewling et al., Urea Manufacture, Field Information Agency Technical, Sept. 3, 1946, p. 4.